United States Patent Office 2,993,106
Patented July 18, 1961

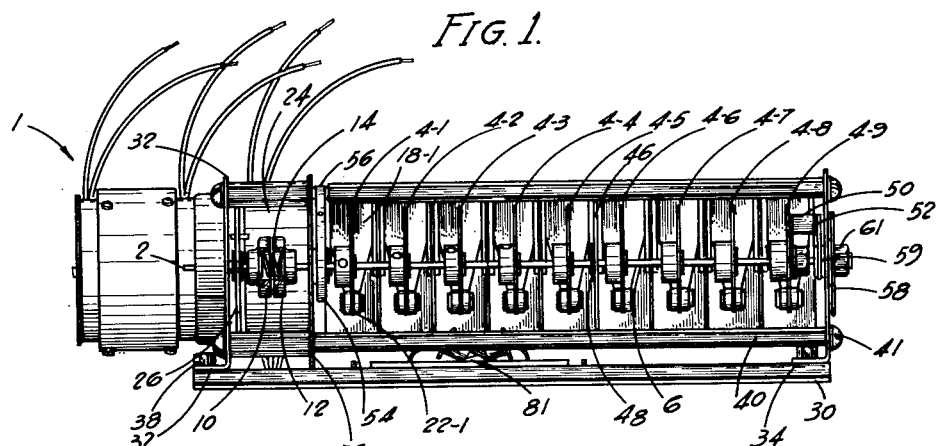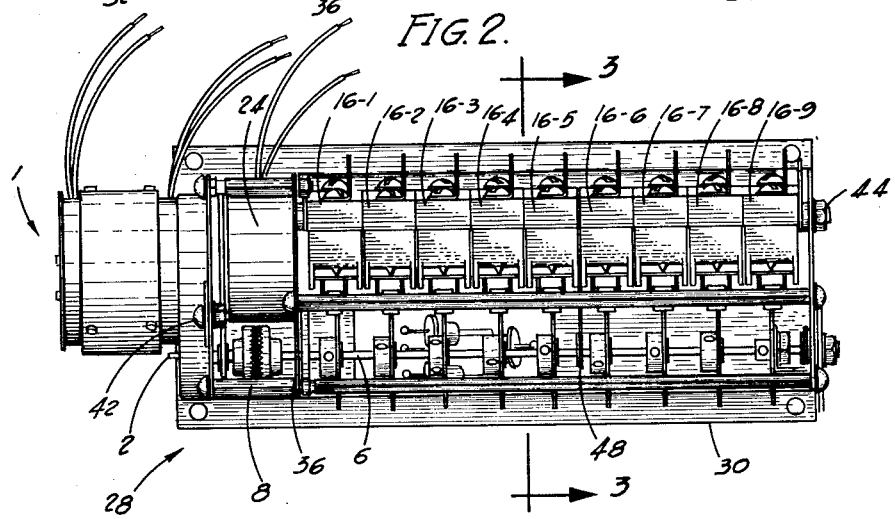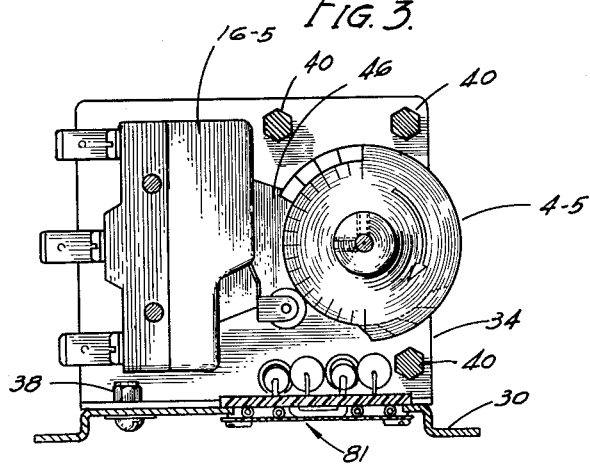

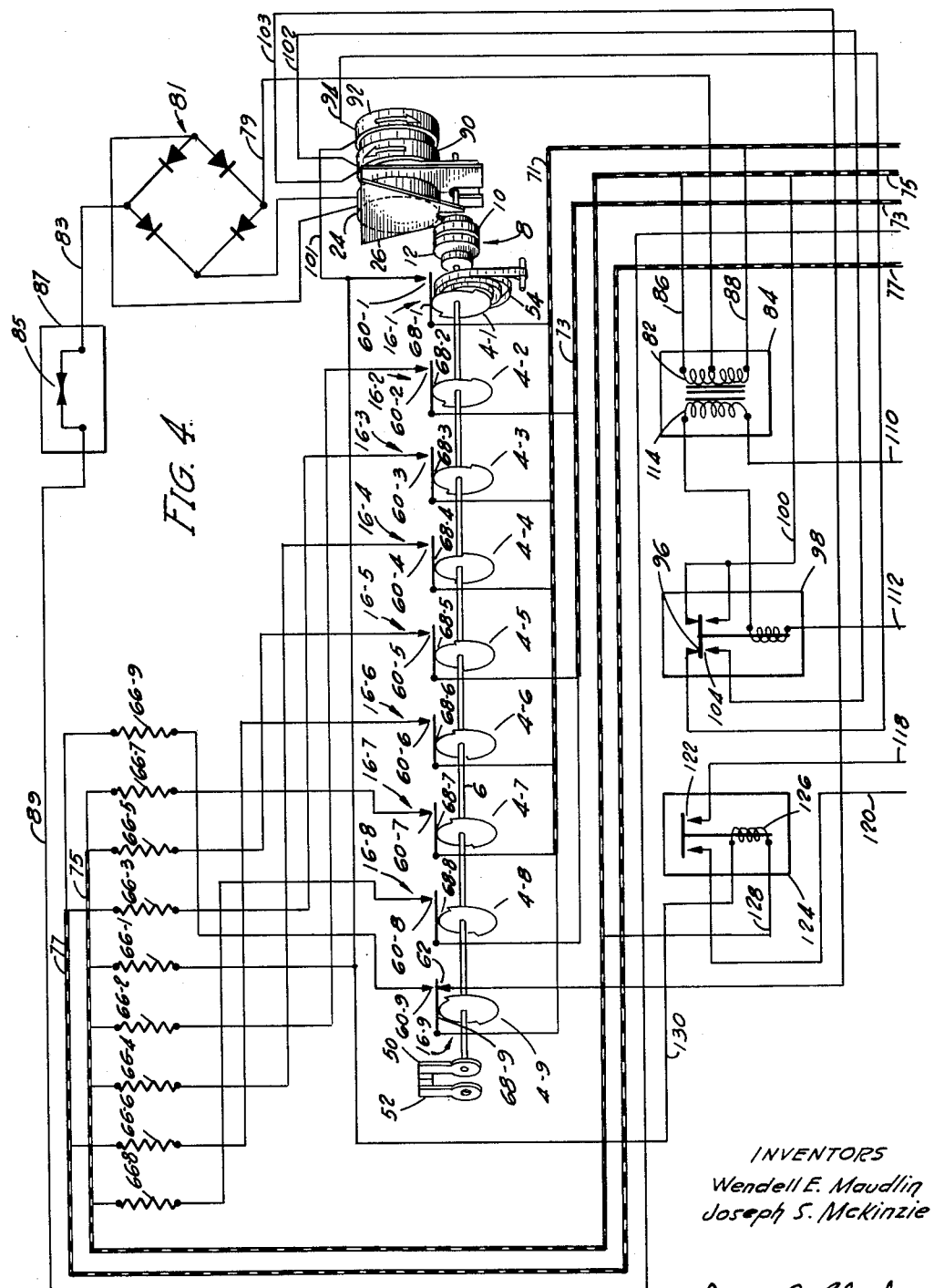

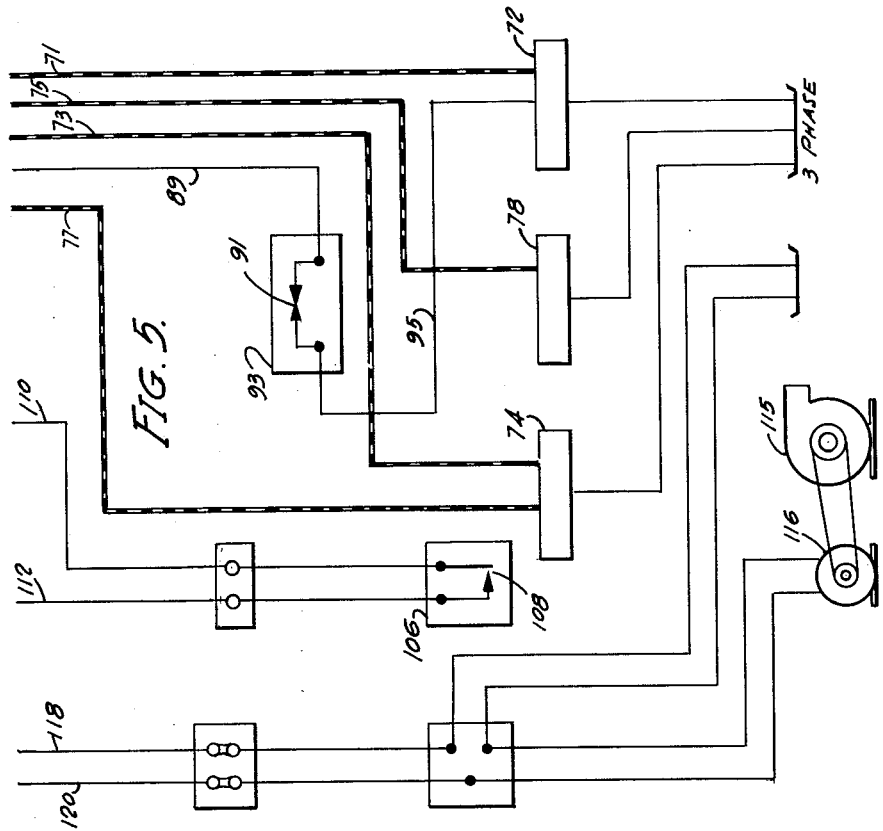

2,993,106
HEATING CONTROL SYSTEM
Wendell E. Maudlin and Joseph S. McKinzie, Lebanon, Ind., assignors to Stewart-Warner Corporation, Chicago, Ill., a corporation of Virginia
Filed Oct. 16, 1959, Ser. No. 847,010
10 Claims. (Cl. 219—20)

This invention relates generally to heating systems and more particularly to a modulated control for such systems.

The preferred embodiment of the present invention has been especially adapted for use in an electrically heated furnace. This type furnace is desirable in areas where the cost of electricity is relatively low. Electric heating systems have been gaining more and more favor in view of their simplicity and convenience. One of their primary advantages is the ease with which a modulated control can be utilized so that excessively high and low ventilating air temperatures can be avoided. With a modulated control, a balance of heat input to heat loss in a building over a period of time is achieved with constant operation of the furnace.

Modulated control systems in use today are generally characterized by a cam means driven by a reversible motor and gear train for sequentially operating a plurality of electrical switches succeeding ones of which when closed result in a greater heat input to the furnace. The typical commercial control includes a series of switches each of which operates a power relay which connects line voltage across a corresponding heating element or elements. One U.S. Patent 2,498,054, issued February 21, 1950, to R. H. Taylor, suggests the use of switches making direct connections between line voltage and corresponding heat elements. However, because of safety and system line loading problems this approach has not been accepted commercially.

The applicants' herein have devised an improved system control arrangement whereby direct connection of the heating elements with the line by means of the switches is commercially practicable. Also as a result of applicants' improved arrangement excessive line loading problems are obviated and an improved overheating safety means is achieved.

Accordingly, it is a primary object of the present invention to provide an improved modulated heating control system which permits direct electrical connection between heating elements and a source of power by way of cam actuated switches which are operated in a predetermined sequence. This improved system is made possible by interposing an electrically operated clutch between the reversible motor and the cam means. The solenoid for operating the clutch is connected to the source of power by way of one or more overheat limit switches, whereby overheat or power failure causes deenergization of the solenoid and disengagement of the clutch elements. The clutch element is then returned to its inoperative position by a spring. Thus, in the event of a power failure and the subsequent restoration of power each heating system on the line utilizing applicants' invention will initially call for no heat and then periodically for greater and greater heat output. In this way, the line will not be initially overloaded by a multiplicity of heating systems connected to the line all calling for power at the same time. In prior art systems, restoration of power after a failure resulted in the heating systems calling for whatever power was being utilized at the time of such failure.

It is another important object of the present invention to provide an improved overheat safety control for a modulated heating system. The improved safety means is afforded by use of the solenoid operated clutch interposed between the drive and cam means together with the cam biasing means. Each time that an overheat condition arises the control is reset to its initial position and retains such position until the furnace temperature falls below the set thermostat temperature. Then the cam means reenergizes the heating elements gradually.

Other objects and the various features of the present invention will be evident upon a perusual of the following description taken in conjunction with the accompanying drawings in which:

FIG. 1 is a front elevation view of the improved control means;
FIG. 2 is a plan view of the control means;
FIG. 3 is a side elevation view along line 3—3 of FIG. 2 showing the cam arrangement;
FIGS. 4 and 5 are a circuit diagram of the control system with a 3-phase power supply; and
FIG. 6 shows a single phase power supply embodiment.

Briefly, the system comprises a plurality of heating elements suitably arranged in the ventilating air passageway of a furnace. In the preferred embodiment, each of the heat elements has one end thereof connected to one terminal of a switch and the other end thereof to a respective line terminal. The other terminals of the switches are suitably connected to line terminals such that each heating element will be connected across the line when its corresponding switch is closed.

The switches are arranged in a predetermined order for sequential operation by a plurality of cam elements. The cam elements are rotated together by means of a reversible motor and gear train at a very low speed. The output shaft of the motor and gear train is connected to one element of a clutch mechanism. The cams are connected to the other element of the clutch mechanism. One of the clutch elements is axially reciprocated by a solenoid into and out of mating engagement with the other clutch element. The solenoid is connected across the line and is therefore normally energized to connect the cams to the motor. Likewise, the motor is connected across the line and is therefore normally energized.

One or more overheat limit switches are placed in series with the solenoid so that it is deenergized in the event of an overheated condition. Deenergization of the solenoid opens the clutch to release the cam elements. The cams are biased to a starting position in which none of their switches are operated. Thus, in the event of a power failure or an overheat condition, all of the switches are opened to deenergize their corresponding heating elements.

Means including a room thermostat associated with the motor control its direction of rotation to rotate the cams in one direction or the other to increase or decrease the heat input to the furnace.

As seen in FIG. 1, the control means comprises a motor and gear train mechanism 1 with a reciprocable output shaft 2. A plurality of cams 4–1 to 4–9 are secured to a common shaft 6 which is coaxial with the shaft 2. A clutch mechanism 8 includes a first element 10 rigidly secured to the shaft 2. A second mating clutch element 12 is rigidly secured to the shaft 6. The clutch elements 10 and 12 are biased axially away from each other by means of a spring 14. In the preferred embodiment, both shafts 2 and 6 are axially moveable within small limits.

A plurality of power switches 16–1 to 16–9 are provided in radial alignment with corresponding cams 4–1 and 4–9. Each of the switches has a pivotal operating arm such as 18–1. The free end of each arm supports a roller such as 22–1. The cam 4–1 engages the roller 22–1 to pivot the arm 18–1 when it reaches a position which is a predetermined angle, for example 15°, with respect to its start position and maintains the arm in the pivoted position in all angular positions greater than 15° from the start position.

Each succeeding cam 4–2 to 4–9 operates its corresponding switch in a position approximately 15° further than that in which the preceding switch was operated. Thus rotation of the cam arrangement through approximately 135° will result in all cams operating their corresponding switches.

A solenoid 24 having an armature 26 controls the axial position of the clutch element 10 to connect or disconnect the cam arrangement from its drive means. The drive means, solenoid, clutch, cams and switches are suitably supported by a frame 28 including a sheet metal base 30, a pair of L-shaped sheet metal brackets 32 and 34, and an intermediate sheet metal plate 36. The brackets are secured to the base by means of nuts and bolts 38. The brackets and plate are secured to each other by means of spacer studs 40 and screws 41.

The motor and gear train mechanism 1 is secured to the bracket 32 by means of nuts and bolts 42. The solenoid is suitably secured to the plate 36, for example by welding. The shaft 6 is rotatably supported by disk bearings (not shown) in the plate 36 and the bracket 34. The switches 16–1 to 16–9 are suitably supported between the plate 36 and the bracket 34 by means of a pair of elongated rods and nuts 44. A central positioning bracket 46 rigidly fixed between switches 16–5 and 16–6 includes a bearing 48 at one end thereof for the shaft 6 to assure accurate alignment of all the switches with their actuating cams.

The shaft 6 supports a stop arm 50 adjacent the cam 4–9. The bracket 34 supports a second stop arm 52. The two arms 50 and 52 engage each other in the start position of the cams under the biasing force of a spring 54. One end 56 of the spring is secured to one of the spacers 40. The other end of the spring is affixed to the shaft 6. A scale indicator disk 58 is supported by the bracket 34 in coaxial relation to the shaft 6. The disk 58 and the stop 52 are fixed to a sleeve 59 which is rotatable on the bracket 34 for adjusting the position of stop 52. A nut 61 locks the disk 58, sleeve 59, and stop 52 in place against the bracket 34.

The circuits shown in FIGS. 4 and 5 will now be described in detail. The switches 16–1 to 16–9 have normally open contacts 60–1 to 60–9 respectively. In addition switch 16–9 includes normally closed contacts 62. The upper contact elements of contacts 60–1 to 60–9 of the switches are connected respectively to the lower terminals of heater elements 66–1 to 66–9 respectively. The switch armatures 68–1, 68–3, 68–4, 68–6, 68–7 and 68–9 are connected by way of a cable 71 to a first line bus bar 72. Armatures 68–2, 68–5 and 68–8 are connected by way of cable 73 to a second bus bar 74. The upper terminals of the heating elements 66–1, 66–2, 66–4, 66–5, 66–7 and 66–8 are connected to a bus bar 78 by way of cable 75. The upper terminal of the heating elements 66–3, 66–6, and 66–9 are connected to the second bus bar 74 by way of cable 77.

In the event that the apparatus is connected to a single phase source of power, a bus bar 80 (FIG. 6) electrically connects bus bars 74 and 78 and cable 73 is connected to bus bar 72.

The clutch solenoid 24 is energized in a full wave rectifier bridge 81. One terminal of the bridge is connected to the bus bar 72 by way of conductor 83, the normally closed contacts 85 of an overheat limit switch 87, conductor 89, the normally closed contacts 91 of an overheat limit switch 93 and conductor 95. Its other terminal is connected to the bus bar 78 by way of conductor 79, the center tap of the primary coil 82 of a step-down transformer 84, and conductor 86. The primary coil 82 is connected to the bus bar 78 by the conductor 86 and to the bus bar 72 by way of the conductor 88.

The drive mechanism 1 includes a first motor coil 90 to drive the output shaft in one direction when it is energized and a second motor coil 92 to drive the output shaft in an opposite direction when it is energized. The coil 92 has one terminal thereof connected to the upper contact element of the first switch 60–1 by conductor 101. The other terminal is connected to the bus bar 78 by way of conductor 94, the down-heat contacts 96 of a heating relay 98 and conductor 100.

The coil 90 has one terminal thereof connected to the bus bar 72 by way of conductor 103, the normally closed switch contacts 62 of switch 16–9, and cable 71. The other terminal of coil 90 is connected to the bus bar 78 by way of conductor 102, the up-heat contacts 104 of the heat relay 98 and conductor 100. Thus with the thermostat calling for heat to cause up-heat contacts 104 to close the coil 90 will be energized until either switch 16–9 is operated to open contact 62 or the thermostat is satisfied. With the thermostat calling for no heat or less heat, the coil 92 is energized until either the thermostat calls for heat or switch 16–1 is operated to open the contact 60–1.

The thermostat 106 includes a pair of contacts 108 which are open when the thermostat is not calling for heat and which are closed when the thermostat calls for heat. When the contacts 108 are closed, a circuit is completed for energizing the heat relay 98 by way of conductors 110 and 112 and a secondary coil 114 of the transformer 84. The voltage in the secondary coil 114 may be in the order of 24 volts.

A furnace fan or blower 115 is operated by a blower motor 116. The blower motor is energized over a circuit including conductors 118 and 120 and normally opened contacts 122 of a fan relay 124. The fan relay 124 includes a coil 126 which closes the contacts 122 when it is energized. One terminal of the relay coil is connected to the bus bar 78 by way of conductor 128. The other terminal of the relay coil is connected to the bus bar 72 by way of conductor 130 and the contacts 60–1 of the first switch 16–1. Hence, the coil 126 is energized while the switch contacts 60–1 are closed and, therefore, whenever one or more of the heating elements 66–1 to 66–9 is energized.

The operation of the control system will now be described in detail. Assume that the system has not been in previous operation and that all of the components are in their normal start positions. The transformer 84 and the clutch solenoid 24 are energized. Contacts 62 are closed. Assume further that the thermostat has been set at a temperature higher than that which exists in the space being heated. The contacts 108 will be closed thereby calling for heat.

When the thermostat contacts 108 close, relay 98 operates to close the up-heat contacts 104. Contacts 104 complete the circuit for energizing the up-heat coil 90 through contacts 62. Since the clutch solenoid 24 is energized, the coil 90 begins to rotate the cams in a direction which will sequentially operate the switches 16–1 to 16–9 in order. When the switch 16–1 is operated by the cam 4–1, contacts 60–1 are closed to energize the first heating element 66–1 and the fan relay coil 126. The coil 126 closes contacts 122 to operate the blower motor 116. The blower 115 forces air through the furnace in heat exchange relation with the element 66–1 and into the space to be heated.

In the event, that the amount of heat required to satisfy the thermostat setting is very small and the thermostat opens contacts 108 prior to cam 4–2 actuating the switch 16–2, the heat relay 98 will open contacts 104 and close contacts 96. The opening of contacts 104 deenergizes the motor 90. Closure of contacts 96 energize the down-heat motor 92 and the cams are rotated in the opposite direction toward the start position. The contacts 60–1 will remain closed or will be opened depending upon whether or not the thermostat recloses contacts 108 in a short enough time interval.

Assuming that the demand for heat is very substantial when the system is put in operation, then the contacts 108 will remain closed for a sufficient period of time to sequentially operate several of the switches 16–1 to 16–9. As each switch is actuated its corresponding heating element 66–1 to 66–9 will be energized. Thus as each succeeding switch is operated, a greater heat input to the furnace is provided. When the space to be heated finally reaches the thermostat setting, contacts 104 will be opened and contacts 96 will be closed as described above. The motor 92 will rotate the cams in a direction tending to open the switches sequentially.

As the thermostat contacts 108 cyclically close and open, the motor and gear train mechanism 1 rotates the switches in one direction or the other closing and opening succeeding switches. The relative demand for heat will determine the average position of the cams 4–1 to 4–9. The relationship of the timing between cams and thermostat cycles is meant to pulse only one switch at a time on any given stable condition. That is, on a relatively mild day the heat loss from the space will be relatively small and will be satisfied by energization of one or a few heating elements 66–1 to 66–9 with the last energized to be the only one cycling with the thermostat cycles. On the other hand an extremely cold day will require the energization of a substantially greater number of heating elements constantly with the last energized to be the only one cycling with the thermostat cycles.

The number of switches which are cyclically operated and restored as space temperature fluctuates is dependent primarily upon the rate at which heat is lost and therefore the rate at which space temperature varies. Hence on a very mild day it will be common for the cam 4–1 to close and open switch 16–1. This cycle may continue at regular intervals determined by the speed at which the cam is rotated. On a cold day, it may be common for the cams to maintain switches 16–1 to 16–5 operated at all times and cycle switch 16–6 on and off periodically.

In the event of a power failure, a clutch solenoid 24 will deenergize. The clutch elements 10 and 12 are disengaged from each other and the biasing spring 54 rotates the shaft 6 until the stop elements 50 and 52 engage each other in the start position. In this position, all of the switches 16–1 to 16–9 are open. When power is restored, the system will require no heating power initially. Only after switches 16–1 to 16–9 are sequentially operated will full or substantial power be required.

Similarly if either limit switch 87 or 93 opens its contacts in response to excessive furnace temperatures, the clutch solenoid 24 will be deenergized to return the cams to their start position. When the furnace temperature drops below a predetermined safe minimum, the limit switch contacts will be closed to reenergize the clutch solenoid 24. Again one or more of the switches 16–1 to 16–9 will be operated sequentially to energize the corresponding heating elements. In this manner an unusually reliable over-heat safety control is provided. Also, the source of power is protected against unusually high starting currents.

While there has been described what is believed to be the preferred embodiment of the invention, it will be appreciated that various changes and modifications may be made therein and it is contemplated to cover in the appended claims all such changes and modifications which fall within the true spirit and scope of the invention.

What is claimed is:

1. In a modulated heating system of the type in which a thermostat controls a series of cams having a start position and a reversible motor to move the cams alternatively in one direction and another incident to the presence and absence of a demand for heat respectively, in which a corresponding series of switches are actuated by the cams in sequence alternatively from a first to a second condition and from the second to the first condition incident to movement of the cams in the one and other directions respectively, and in which a corresponding series of electrical heating elements are caused to be alternatively energized or deenergizing in sequence by the switches incident to actuation of the switches from the first to a second condition and from the second to the first condition respectively, the combination with the motor and cams of a clutch, a solenoid, a circuit including a source of power normally energizing the solenoid, the solenoid operating the clutch in its energized condition to connect the motor and cams and operating the clutch in its deenergized condition incident to a power failure to disconnect the cams from the motor, and a spring moving the cams in said other direction to their start position upon disconnection of the cams from the motor.

2. The combination of claim 1 together with an overheat limit switch in the circuit deenergizing the solenoid incident to an unsafe overheat condition for movement of the cams to the start position by the spring.

3. In a modulated heating system of the type in which an electrical means is engerized to produce heat and in which a thermostat controls a cam structure having a start position and reversible drive means for the cam structure to progressively increase or decrease the heat produced by the electrical means, the combination with the drive means and the cam structure of a clutch, a solenoid, a circuit including a source of power normally energizing the solenoid, the solenoid operating the clutch in its energized condition to connect the drive means and the cam structure and operating the clutch in its deenergized condition incident to a power failure to disconnect the cam structure from the drive means, and a spring moving the cams to the start position upon disconnection of the cam structure from the drive means.

4. The combination of claim 3 together with an overheat limit switch in the circuit deenergizing the solenoid incident to an unsafe overheat condition to cause movement of the cam structure to its start position by the spring.

5. In a modulated heating system having means heating a heat exchange fluid at varying rates, control apparatus comprising a plurality of switches arranged in a predetermined order to control the heating means, cam means operating the switches in sequence during movement of the cam means in one direction from a start position and in the opposite direction toward the start position to cause a respective increase or decrease in the rate at which the heat is produced by the heating means, a reversible drive means for moving the cam means alternatively in the one and opposite directions, a clutch effective to connect the cam means and drive means, a solenoid normally rendering the clutch means effective but rendering the clutch means ineffective incident to power failure, a biasing spring returning the cam means rapidly to its start position incident to the clutch means being rendered ineffective.

6. The combination of claim 5 together with an overheat limit switch operating the solenoid incident to overheating of the fluid to render the clutch ineffective.

7. In a modulated heating system having means heating a heat exchange fluid at varying rates, control apparatus comprising a plurality of devices arranged in a predetermined order to control the heating means, cam means operating the devices in sequence during movement of the cam means in one direction from a start position and in the opposite direction toward the start position to cause a respective increase or decrease in the rate at which the heat is produced by the heating means, a reversible drive means for moving the cam means alternatively in the one and opposite directions, a clutch effective to connect the cam means and drive means, a solenoid normally rendering the clutch means effective but rendering the clutch means ineffective incident to power failure, a biasing spring returning the cam means rapidly in the start position incident to the clutch means being rendered ineffective.

8. The combination of claim 7 together with an overheat limit switch operating the solenoid incident to overheating of the fluid to render the clutch ineffective.

9. In a modulated heating system having means heating a heat exchange fluid at varying rates, control apparatus comprising a plurality of devices arranged in a predetermined order to control the heating means, cam means operating the devices in sequence during movement of the cam means in one direction from a start position and in the opposite direction toward the start position to cause a respective increase or decrease in the rate at which the heat is produced by the heating means, a reversible drive means for moving the cam means alternatively in the one and opposite directions, means for releasing said cam means from said drive means incident to a power failure, and means for returning the cam means to the start position incident to the release of said cam means from said drive means.

10. The combination of claim 9 together with means for releasing said cam means from said drive means incident to overheating of said fluid.

References Cited in the file of this patent

UNITED STATES PATENTS

| | | |
|---|---|---|
| 1,522,988 | Warren | Jan. 13, 1925 |
| 2,663,786 | Illian et al. | Dec. 22, 1953 |
| 2,700,505 | Jackson | Jan. 25, 1955 |
| 2,788,416 | Kilbury | Apr. 9, 1957 |
| 2,848,588 | Hackman | Aug. 19, 1958 |